United States Patent
Gim et al.

(10) Patent No.: US 7,365,899 B2
(45) Date of Patent: Apr. 29, 2008

(54) MICROMIRROR WITH MULTI-AXIS ROTATION AND TRANSLATION

(75) Inventors: Dong Woo Gim, Gyoungnam (KR); Gyoung Il Cho, Seoul (KR); Jin Young Sohn, Fullerton, CA (US); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 11/463,875

(22) Filed: Aug. 10, 2006

(65) Prior Publication Data

US 2008/0037102 A1    Feb. 14, 2008

(51) Int. Cl.
*G02B 26/00*    (2006.01)

(52) U.S. Cl. .................................. 359/295; 359/292
(58) Field of Classification Search ............. 359/292, 359/295, 851, 853, 872
See application file for complete search history.

(56) References Cited

U.S. PATENT DOCUMENTS

| | | | | |
|---|---|---|---|---|
| 6,999,226 | B2 * | 2/2006 | Kim et al. | 359/291 |
| 7,057,826 | B2 * | 6/2006 | Cho et al. | 359/683 |
| 7,077,523 | B2 * | 7/2006 | Seo et al. | 353/10 |
| 7,239,438 | B2 * | 7/2007 | Cho et al. | 359/290 |
| 7,267,447 | B2 * | 9/2007 | Kim et al. | 359/846 |
| 2005/0152019 | A1 * | 7/2005 | Mushika | 359/291 |

* cited by examiner

*Primary Examiner*—David N. Spector

(57) ABSTRACT

The present invention discloses a micromirror device with multi-axis rotational and translational motion. Newly introduced structure of the top electrode plate improves structural stability, flexibility, and more motion efficiency of the micromirror device. The invention also improves controllability of micromirror motion by designing the appropriate flexible structure to generate desired motion. With side-by-side arrangement of the micromirror devices, the micromirror devices are built as an array to form a micromirror array lens.

35 Claims, 9 Drawing Sheets

MICROMIRROR WITH MULTI-AXIS ROTATION AND TRANSLATION

FIELD OF INVENTION

The present invention relates to micromirror structure and design. Particularly, the invention relates to micromirror structure and design with multiple degrees of freedom motion including multi-axis rotation and translation.

BACKGROUND OF THE INVENTION

Since the birth of the micromirror device, many kinds of micromirrors have been developed and used for various kinds of optical applications. Most of them have one degree of freedom rotation without any out-of-plane motion, that is, only tilt about one axis. For more complicated optical applications, gimbal structured micromirrors have been developed to have rotational motion about two axes. However, those kinds of micromirrors with gimbal structure have exposed structures to support and to rotate micromirror structure. Since such structures are big in size and the control structures are not concealed, the optical efficiency of the micromirror is decreased due to the low fill factor of the device. Also big out-of-plane dimension and high power consumption are major problems of gimbal structured micromirrors.

Smaller sized micromirror makes the out-of-plane motion amounts reduced and also improves the efficiency of the micromirror motion. There are few micromirror structures to improve optical efficiency and motion efficiency with multi-axis rotation and translation such as U.S. Pat. Nos. 6,028,689 to Michalicek, No. 6,906,848 to Aubuchon. Those structures are using appropriate flexure structure and concealed underneath structure.

After the concealed structure is developed, the size and motion efficiency problems seem to be solved since they offer a good fill factor of the system and motion efficiency. But there still remains bunch of problems to be solved to have efficient motion and higher optical efficiency, such as weaknesses in structural stability, structural flexibility, motion controllability, and so on.

To overcome the disadvantages of the prior arts, the present invention discloses new structures and designs for the micromirror with multi-axis rotation and translation with structural stability and controllability.

Especially the micromirror structure of the present invention has a lot of advantages such as high controllability of the micromirror system, structural stability thanks to the newly introduced top electrode plates, and high efficiency of the micromirror motion.

SUMMARY OF THE INVENTION

The present invention contrives to solve the disadvantages of the conventional micromirrors with multi-axis rotational and translational motion.

The objective of the present invention is to provide a new design and control method of the micromirror with multiple degrees of freedom motion. The present invention also extends its advantages to the applications of the micromirror array which are explained in U.S. Pat. Nos. 6,396,619 to Huibers and No. 6,389,190 to Solgaard and micromirror array lens, which is explained in the U.S. Pat. No. 6,934,072, No. 6,934,073, No. 6,972,284, No. 6,999,226, and No. 7,031,046 to Kim.

With the newly introduced structure of the top electrode plate, the present invention keeps a small gap between two actuating planes (bottom and top electrodes), and improves structural stability, flexibility, and efficiency in motion.

The present invention also improves controllability of the motion by applying an appropriate flexible structure to generate desired motion. Thanks to the flexible structure, the motion of the micromirror device becomes more efficient and the operating voltage is reduced.

The micromirror device of the present invention comprises a micromirror structure with a reflective surface having rotational and translational motions, a substrate with bottom electrode or electrodes to provide actuation force for micromirror motions and control circuitry, a top electrode plate underlying the micromirror structure and electrically coupled with the bottom electrode to provide actuation force for micromirror motions, a post structure connecting the micromirror structure and the top electrode and preventing deformation of the micromirror structure, a flexible structure providing restoration force for micromirror motions and connected to the top electrode, and a pillar structure supporting the flexible structure from the substrate.

Depending on the applications and geometry, the micromirror has a fan, rectangular, square, hexagonal, or triangular shape. The shape of the micromirror is determined on the basis of the efficiency of micromirror motion, the system geometry, fill factor of the system, and so on.

The micromirror is actuated by actuation force between the top electrode and the bottom electrode. By introducing one or more top electrode plates as an actuation layer, the bottom electrodes on the substrate pull the top electrode rather than the micromirror layer itself. By introducing the top electrode, the acting gap of the electrostatic force is considerably reduced. Since the actuation force is electrostatic force (capacitive force), the gap between the electrodes is very important for evaluation of the actuation force. The reduced gap of the present invention increases the electrostatic force and also increases motion efficiency of the micromirror device.

The micromirror structure has a reflective surface to increase the reflectivity of the micromirror structure. The reflective surface of the micromirror structure is substantially flat. In some cases, the reflective surface of the micromirror structure preferably has a curvature in order to enhance the optical properties of the surface profile of the micromirror or micromirror array. Also the curvature of the micromirror structure is controlled for enhancing the optical properties of the micromirror or micromirror array. The curvature of the micromirror structure is controlled by electrothermal force.

The reflective surface has a layer or layers to have high reflectivity. The reflective surface layer is made of metal or metal compound. The reflective surface layer is also made of multi-layered dielectric materials. The reflective surface layers are made of metal and dielectric material to enhance the reflectivity of the micromirror.

One of the main purposes of the present invention is to enhance the efficiency of micromirror motion. To enhance the micromirror motion efficiency, the most critical point is the electrostatic force which is induced by the electrodes. The bottom electrode has a stepped structure to increase electrostatic force by reducing gap between the electrodes. The stepped structure of the bottom electrode can be expanded as long as the stepped structure does not hinder the motion of the micromirror.

To properly control the micromirror or micromirror array, the micromirror has control circuitry to supply the electrical power to the electrodes. The control circuitry selectively supplies electric power to the corresponding electrodes to have desired motion of the micromirror or micromirror array. The control circuitry can be constructed by using semiconductor microelectronics technologies such as MOS or CMOS.

To have restoration force of the micromirror motion, a structure with elastic force should be introduced. In the present invention, a flexible structure provides a restoration force for micromirror motions and also connects the top electrode and the pillar structure which supports the micromirror structure from the substrate through the flexible structure. The flexible structure can be a kind of micro structured spring and gives restoration force to the micromirror motions. The flexible structure can be located in the same layer with the top electrode plate.

The top electrode plate can further comprise a post in different layer to connect the top electrode plate and the flexible structure. The flexible structure is located between the top electrode plate and the micromirror structure. The flexible structure between the top electrode and the micromirror structure has two major advantages in design and operation of the micromirror device. Since the flexible structure is not located in the same layer with the top electrode plate, the top electrode area can be maximized to have stronger electrostatic force. And the flexible structure also has more flexibility thanks to the large area for the effective spring.

For the precise control of micromirror motion, the flexible structure must be designed to have an appropriate rotational and translational stiffness. In order to have the desired structure with sufficient stiffness, the flexible structure should be varied in its shape and size. Thanks to the increased area for the flexible structure in its own layer, the micromirror device has higher efficiency of the motion and can also be operated at lower operating voltage.

Differently from other micromirror devices, the present invention uses one or more top electrode plates as an actuation layer, not a micromirror layer itself. Since the actuation force mainly depends on the gap and the area of two electrodes with different potential, the present invention has an advantage of the reduced gap between bottom and top electrodes and also the expanded size of electrodes. The present invention needs much smaller voltage input thanks to the improved design and smaller gap between substrate and top electrode plate.

For the case of other micromirror devices with the structure of attracting the micromirror itself, it is difficult to modify the micromirror design. Even the smallest change in the micromirror device gives a large difference to the operational condition. But in the present invention, the top electrode plate gives the flexibility in the structural variations without any change on the micromirror structure. The influence by the modification is separated into two parts, i.e., the structures below the top electrode and the structures above the top electrode. The modification in one side cannot make change in the other side.

The top electrode plate and the micromirror structure are connected by a post structure. Since the top electrode and the micromirror structure are just like two-layered structure, they have a strong resistance to the deformation of the structures. The post structure connecting the micromirror structure and the top electrode prevents deformation of the micromirror structure. The micromirror device can have multiple post structures connecting the top electrode plate and the micromirror structure to prevent deformation of the micromirror structure. While design optimization process in design, more posts can be located where the deformation of the micromirror is severe. The multiple post structure also gives firm attachment between the top electrode and micromirror structure thus provides motion stability of the micromirror device thanks to the strong attachment between the micromirror structure and the top electrode plate. The strong attachment between the micromirror structure and the top electrode plate must be present since the top electrode is the actually attracted part by the electrostatic force and the micromirror structure is the structure to be attracted for operation.

Also the design modification of the micromirror device can easily be applied. No matter how big modification on the micromirror structure or on the structure above the top electrode is, there is no difference in applied voltage and actuation force because the attraction force is mainly determined by the potential difference and the gap between the bottom and top electrodes. Without increasing the operational voltage or decreasing the electrostatic force, additional structures can easily be added.

While the micromirror device can be used as a single micromirror device itself, a micromirror array can be built comprising a plurality of micromirror devices said with side-by-side arrangement. If the micromirror device is used as an array, the array has various functions and a large variety in utility areas.

The micromirror devices in the micromirror array are controlled independently with proper control circuitry in the substrate. Also the micromirror devices in the micromirror array can be controlled by a common input signal to form an optical surface profile. By controlling the micromirror devices in the micromirror array, the micromirror array can form various surface profiles. The control circuitry provides means to control surface profile of the micromirror array with minimum inputs. The control circuitry can be constructed by using known semiconductor microelectronics technologies such as MOS and CMOS.

The micromirror array can be used as a spatial light modulator. The micromirror array also forms a micromirror array lens, which is explained in the U.S. Pat. No. 6,934,072, No. 6,934,073, No. 6,972,284, No. 6,999,226, and No. 7,031,046 to Kim, U.S. Patents Pub. No. 2005/0264870 by Kim, No. 2006/0012852 by Cho, and U.S. patent application Ser. No. 11/191,886 by Cho in detail, all of which are hereby incorporated by references. The micromirror array forms a lens (micromirror array lens) by satisfying phase matching condition and convergence condition. Also the micromirror array can be used as an array of optical switch. Since every micromirror device in the micromirror array has a function of an optical switching, the whole micromirror array can be used as an array of optical switching devices.

To have a function of a micromirror array lens, the micromirror array should satisfy two conditions to form a good lens. One is the convergence condition that every light should be converged into a focal point. The other is the phase matching condition that the phase of the converged light should be the same. In a conventional lens, the phase matching condition is that all the light passing through a lens should have the same optical path length to the focal point. But micromirror array lens arranged in a flat surface uses the periodicity of the light to satisfy the phase matching condition. Since the same phase condition occurs periodically, the phase matching condition can be satisfied even though the optical path length is different. Each micromirror in the micromirror array lens can be controlled independently to satisfy the phase matching condition and the convergence condition.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
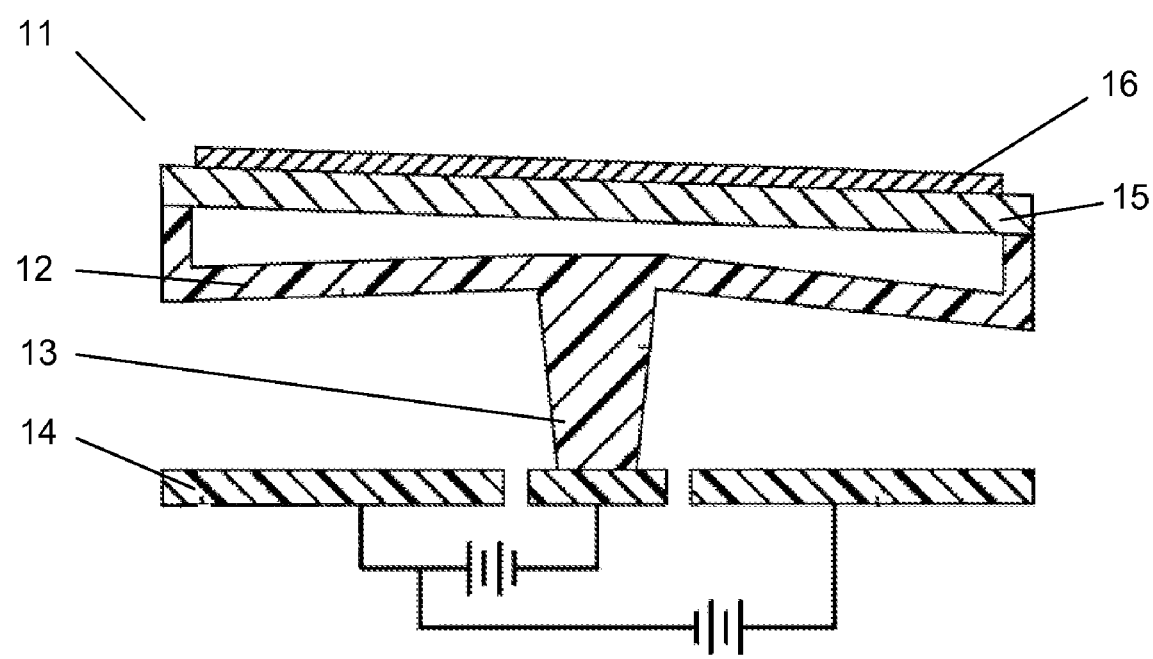
FIG. 1 is a perspective diagram of prior art showing the cut-away side view of a micromirror.

FIG. 1 shows the cut-away side view of micromirror device 11 in U.S. Pat. No. 6,028,689 to Michalicek, et al., entitled "Multi-Motion Micromirror". The micromirror device 11 has four flexible support arms 12, a center support post 13, and four address electrodes 14. The micromirror 15 with reflective surface 16 can be tilted and retracted according directly to varying potentials of four electrodes 14. The micromirror 15 can be tilted on two axes to scan one or more fields of regard and can simultaneously be retracted or elevated.

Figure 2:
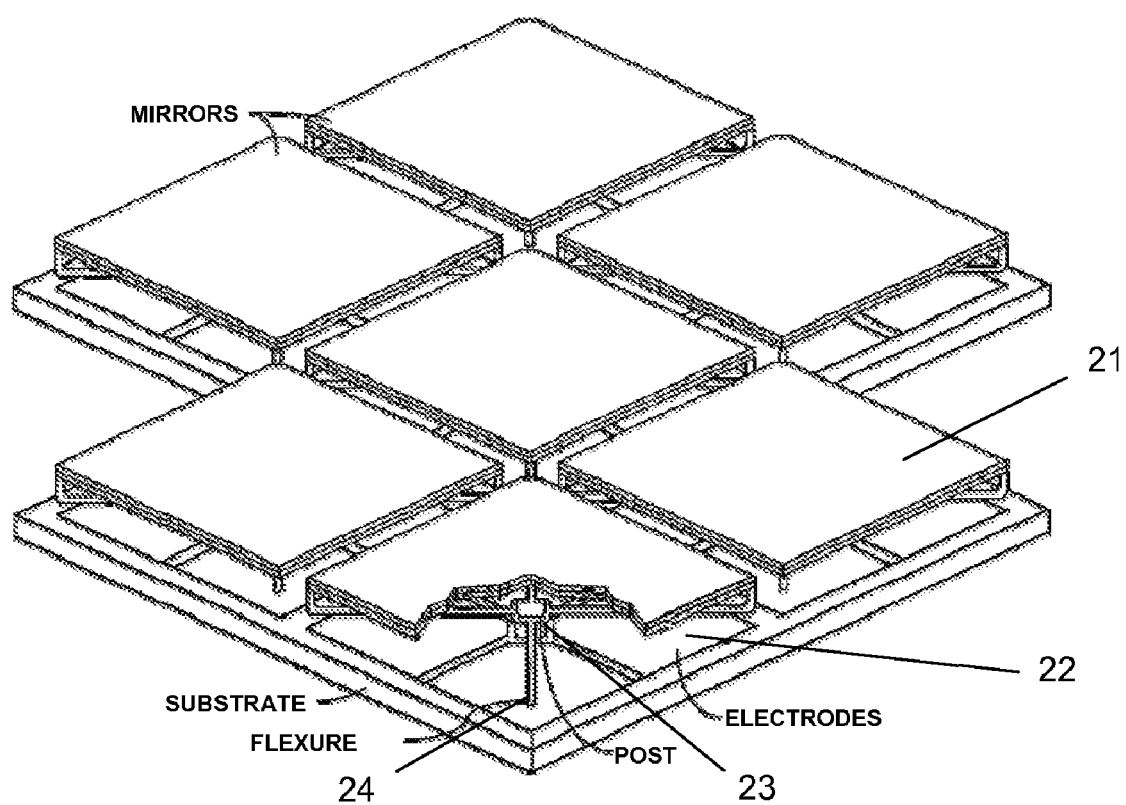
FIG. 2 is a perspective view of prior art showing micromirror array.

FIG. 2 shows the side-by-side array of the micromirror 21 of FIG. 1. All underneath structures of electrodes 22, post 23, and flexures 24 are positioned beneath the micromirror so as to increase the fill factor to maximize the reflective area.

Figure 3:
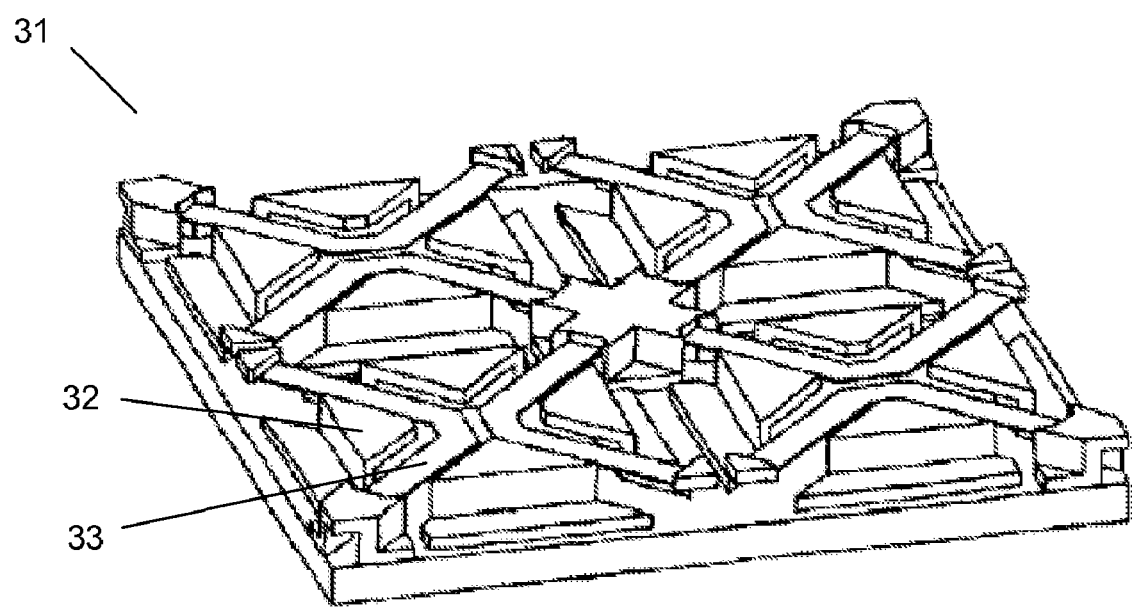
FIG. 3 is a perspective view of prior art showing underneath structures of micromirror array.

FIG. 3 shows underneath structures 31 without mirror layer in array of a prior art, which is stated in U.S. Pat. No. 6,906,848 to Aubuchon entitled "Micromirror Systems with Concealed Multi-Piece Hinge Structures". By the electrodes 32 with varied voltages and the torsion and cantilevered flexures 33, it is allowed to have multi-axis tilting motion and vertical motion. Since all underneath structures are concealed beneath the micromirror, the loss of the light is minimized and fill factor is enhanced. The electrodes 32, however, still pull the mirror itself.

Figure 4:
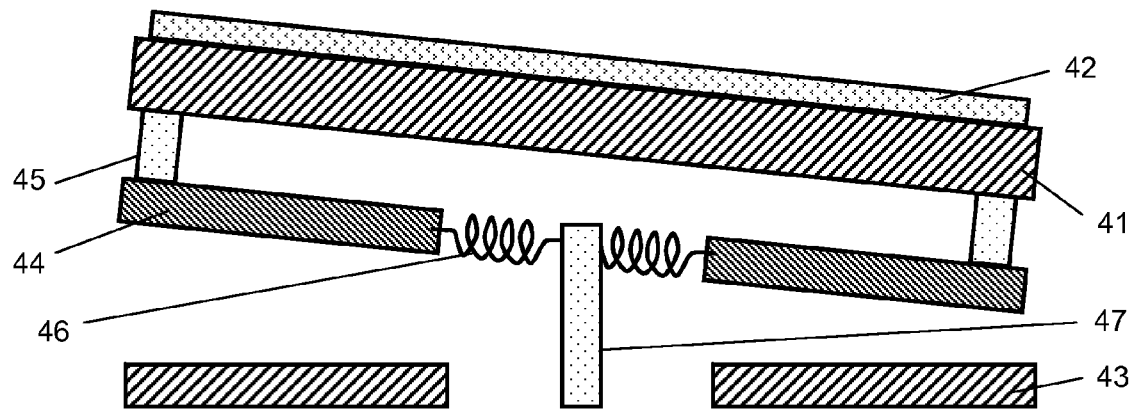
FIG. 4 is a schematic diagram showing the cut-away side view of the micromirror device with spring structures and top electrode plate in the same layer.

FIG. 4 is a schematic diagram showing the cut-away side view of the micromirror device of the present invention with spring structures and top electrode plate in the same layer. The micromirror device of the present invention comprises a micromirror 41 with a reflective surface 42 having rotational and translational motions, a substrate with bottom electrode or electrodes 43 to provide actuation force for micromirror motions and control circuitry, a top electrode plate 44 underlying the micromirror structure 41 and electrically coupled with the bottom electrode 43 to provide actuation force for micromirror motions, a post structure 45 connecting the micromirror structure 41 and the top electrode 44 and preventing deformation of the micromirror structure 41, a flexible structure 46 providing restoration force for micromirror motions and connected to the top electrode 44, and a pillar structure 47 supporting the flexible structure 46 from the substrate.

The present invention has one or more top electrode plates 41 in the same layer as a flexible structure 46. The top electrode plate 44 can be designed to minimize the out-of-plane dimension and maximize the power efficiency. For the case of attracting the micromirror itself, it is not flexible to modify the micromirror design. Without any change on the micromirror structure 41, the top electrode plate 44 gives the flexibility for the structural design variations. The other important role of the top electrode plates 44 is to provide structural stability. By connecting the micromirror structure 41 to the top electrode plate 44 with post structures 45, the deformation of the micromirror structure 41 can be prevented or reduced.

The micromirror structure 41 is controlled electrostatically and/or electromagnetically by the actuating components such as top electrode 44 and bottom electrode 43. All the mechanical structures and the actuating components 43, 44 are positioned beneath the micromirror structure 41 in order to maximize the effective reflective area of the micromirror device. The reflective surface 42 of the micromirror structure 41 is made of metal, metal compound, multi-layered dielectric material, or other materials with high reflectivity. Many known microfabrication processes can make the reflective surface have a high reflectivity.

No matter how big the upper dimension above the top electrode layer is, there is no difference in applied voltage because the electrostatic force mainly dependent on the potential difference and the gap between the bottom electrode 43 on the substrate and the top electrodes 44. Therefore, other necessary structures can be easily added or modified without increasing the gap between the electrodes 43, 44, thus without change in operational voltage.

To reduce the operational voltage and have the higher motion efficiency of the micromirror device, the bottom electrode 43 has a stepped structure to increase electrostatic force by reducing gap between the electrodes. The stepped structure of the bottom electrode 43 can be expanded as long as the stepped structure does not hinder the motion of the micromirror.

The micromirror structure 41 has a reflective surface 42 to increase the reflectivity of the micromirror. The reflective surface 42 of the micromirror structure 41 is substantially flat. In some cases, the reflective surface 42 of the micromirror structure 41 preferably has a curvature in order to enhance the optical properties of the surface profile of the micromirror or micromirror array. Also the curvature of the micromirror structure 41 is controlled for enhancing the optical properties of the micromirror or micromirror array. The curvature of the micromirror structure 41 is controlled by electrothermal force.

Figure 5:
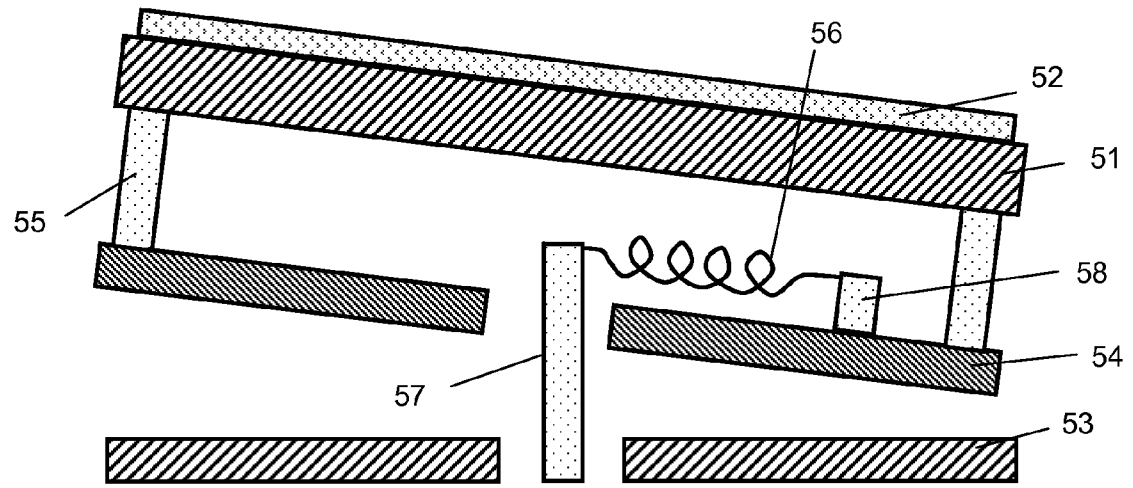
FIG. 5 is a schematic diagram showing the cut-away side view of the micromirror device with spring structures and top electrode plate in different layers.

FIG. 5 is a schematic diagram showing the cut-away side view of the micromirror device with spring structures and top electrode plate in different layers. In this embodiment, the micromirror device comprises a micromirror 51 with a reflective surface 52 having rotational and translational motions, a substrate with bottom electrode or electrodes 53 to provide actuation force for micromirror motions and control circuitry, a top electrode plate 54 underlying the micromirror structure 51 and electrically coupled with the bottom electrode 53 to provide actuation force for micromirror motions, a post structure 55 connecting the micromirror structure 51 and the top electrode 54 and preventing deformation of the micromirror structure 51, a flexible structure 56 providing restoration force for micromirror motions and connected to the post 58 in the top electrode 54, and a pillar structure 57 supporting the flexible structure 56 from the substrate.

A post structure 58 is added to have the top electrode plates 54 and the flexible structure 56 in different layers. Sometimes, it is better to have flexible structure 56 in the different layer from the top electrodes 54. In order to make the flexible structure 56 more flexible, a thinner layer and more space in plane are needed respectively. However, the flexible structure 56 and top electrode plate 54 would preferably be separated in different layers. As just shown in the FIG. 5, the flexible structure 56 is preferably located in the layer between the micromirror structure 51 and the top electrode plate 54. This embodiment has advantages of having more flexible structure 56 and larger top electrode 54 to have higher efficient motion of the micromirror device.

Figure 6A:
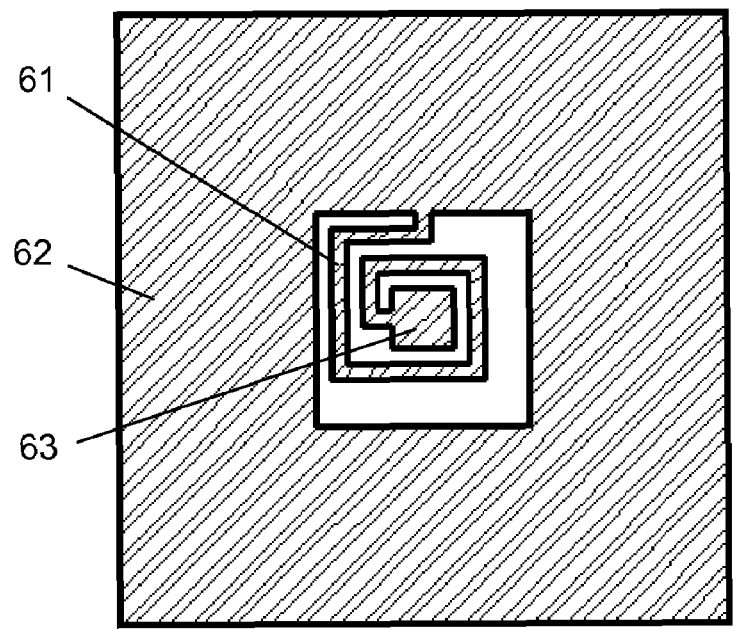
FIGS. 6a-6c are schematic diagrams showing examples of the spring structures and the top electrode plate in the same layer.
Figure 6B:
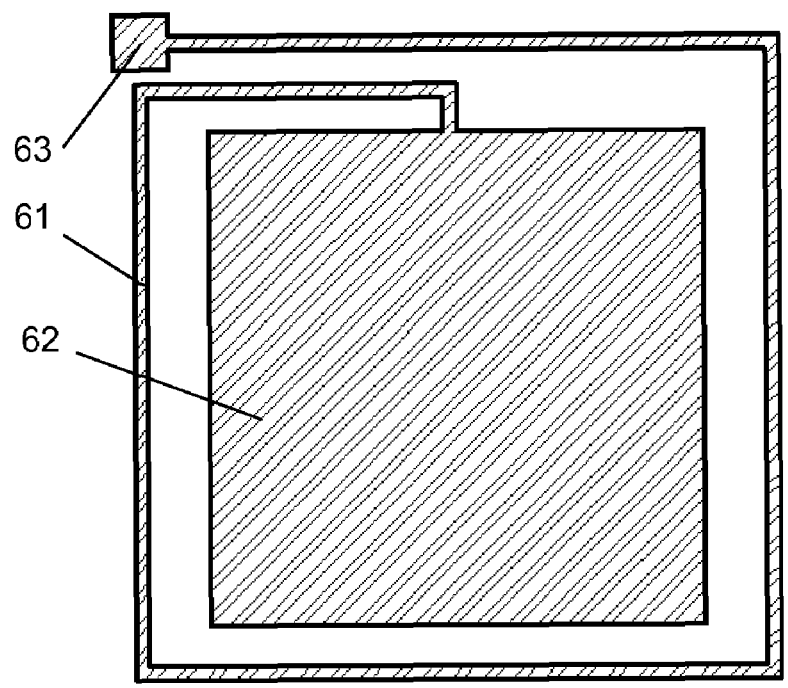
Figure 6C:
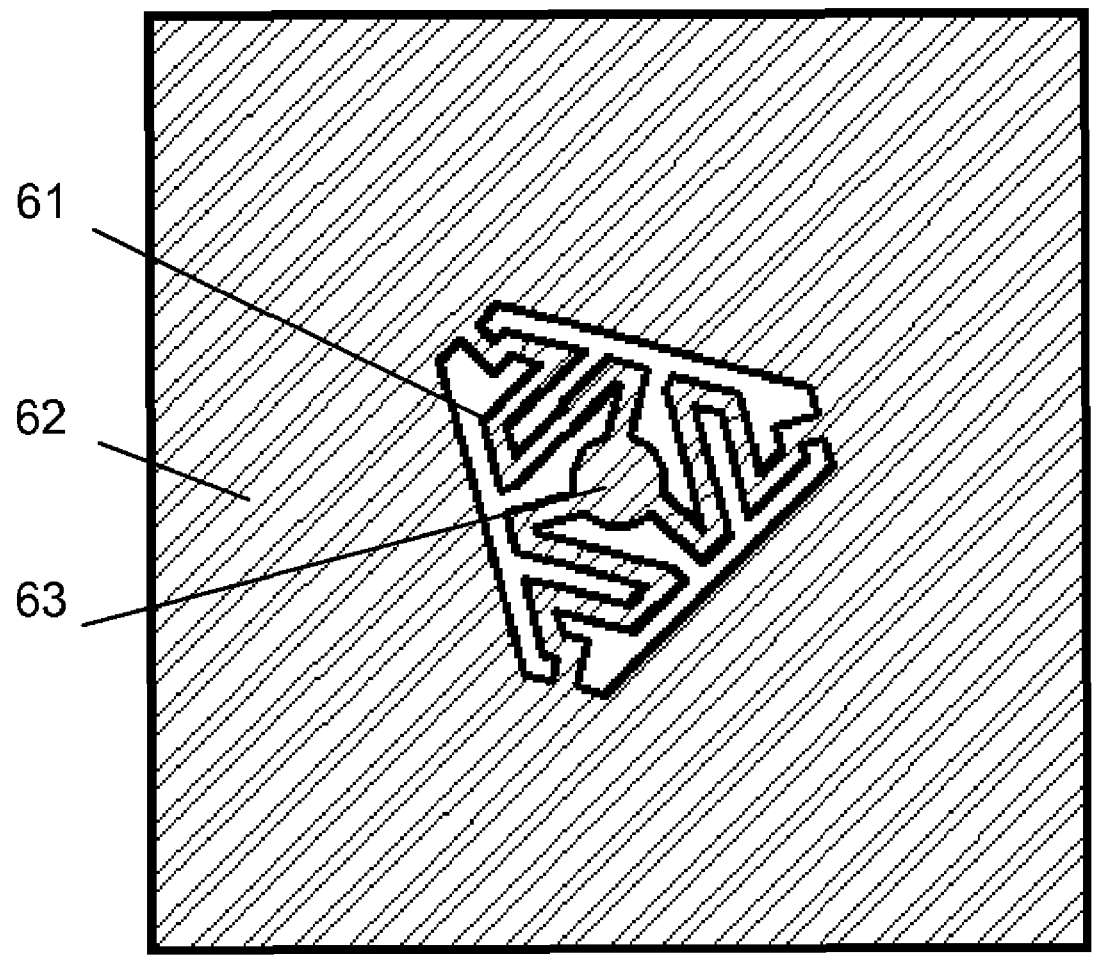

FIGS. 6a-6c show some examples for the flexible structure 61 and the top electrode plate 62 at the same layer. In FIGS. 6a and 6c, the top electrode 62 has a shape of square just like the micromirror structure. The top electrode 62 is connected to the micromirror structure by the post structures (not shown in the figures). The top electrode 62 also prevents the deformation of the micromirror structure. The area of the top electrode 62 is maximized by selecting the top electrode 62 as a whole. The flexible structure 61 is connected to the top electrode 62 and to the pillar structure 63 on the other side. The pillar structure 63 is fixed as the center of the motion of the micromirror structure and the top electrode plate 62 is tilted and elevated by the electrostatic force induced by the bottom electrodes (not shown in the figures) and the top electrode 62.

To have many different motions of micromirror structure, many electrodes are needed apart from variation of the control voltage. Even though there are many bottom electrodes, the top electrode 62 can be one, which is attracted by bottom electrodes in motion generation. Also the top electrode 62 does not need to have the same shape as the corresponding bottom electrodes. Only one large top electrode 62 is enough for the many different motions of the micromirror structure and the bottom electrodes. Also if the top electrode 62 is grounded instead of applying a certain voltage, the possible electric contact problem can be solved. Since all the moving parts are connected with the top electrode, the possible electric contact is all between the grounded structures not voltage applied structures. Only voltage applied structures are the bottom electrodes which are firmly embedded in the substrate. The grounding top electrode 62 can be achieved through the pillar structure 63.

In FIG. 6b, the top electrode 62 has a different shape with the micromirror structure. The fixed pillar structure 63 is no longer located at the center of the top electrode 62. By locating the pillar structure 63 at the left top corner, the flexible structure 61 has its length longer than before with the same area of micromirror structure. As the length of the flexible structure 61 increases, the flexibility of the micromirror motion also increases.

With the structure of the micromirrors in the prior arts, it is not merely simple problem to control the rotation and the translation simultaneously. But in the present invention, the flexible structure has the flexible motion of rotational degrees of freedom and of translational degree of freedom altogether. Moreover, the precise motion control can be achieved by using the structure of the present invention to satisfy the requirement for the optical performance. For the precise control of micromirror motion, the flexible structure 61 must properly be designed to have appropriate rotational and translational stiffness. In order to design the desired structure with appropriate stiffness, the flexible structure 61 can be varied in its shape and size as shown in FIGS. 6a-6c. It is obvious that there are lots of other kinds of flexible structures 61 and the appropriate design with desired stiffness can be achieved and optimized.

Figure 7A:
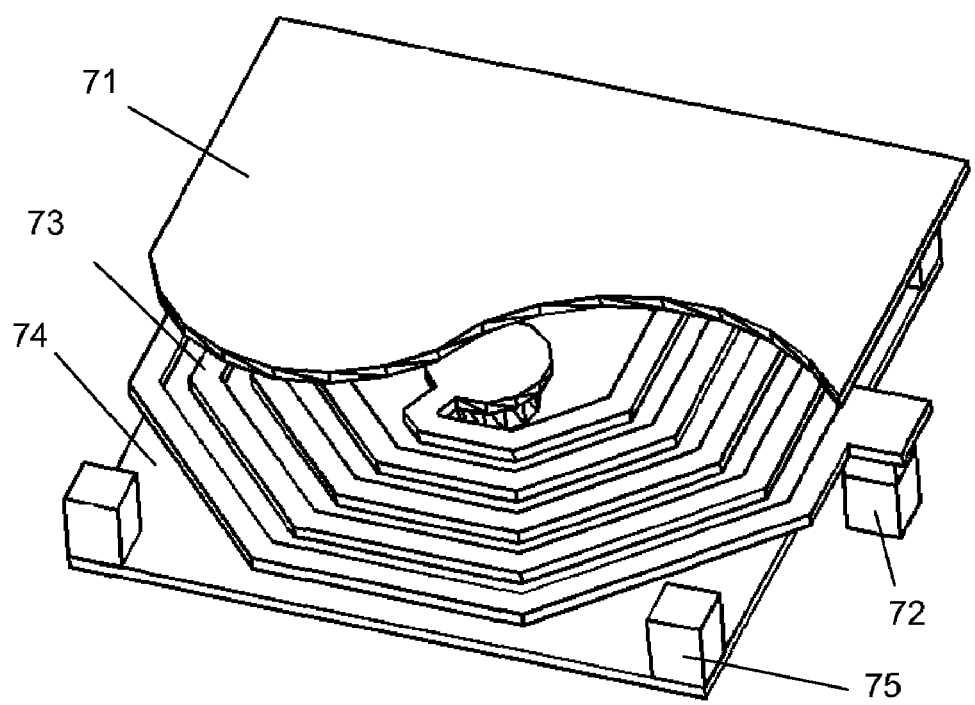
FIGS. 7a-7b are schematic diagrams showing examples of the spring structures and the top electrode plate in different layers.
Figure 7B:
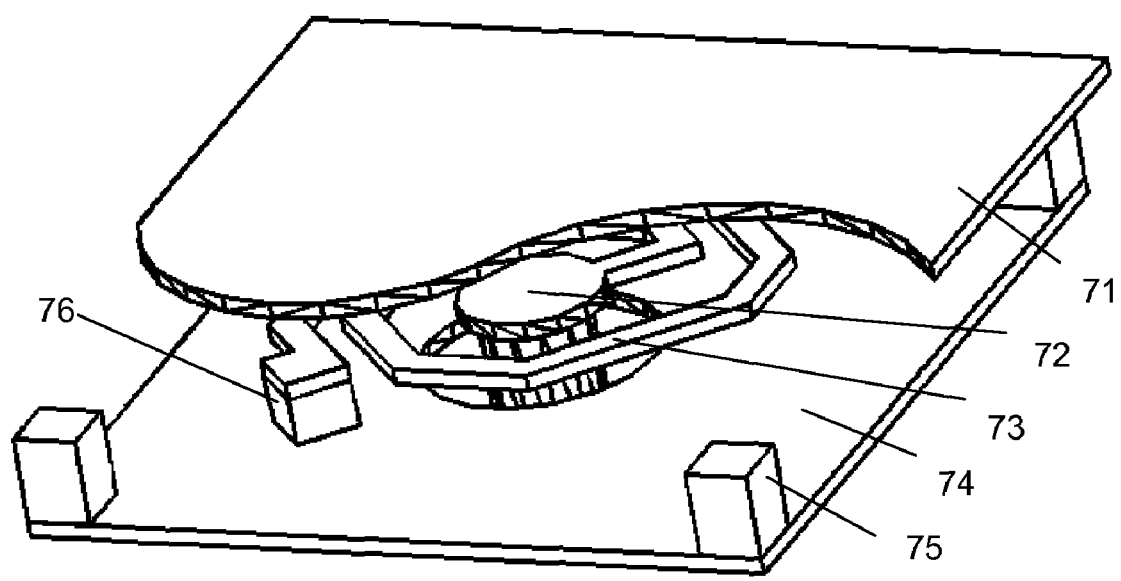

FIGS. 7a-7b show examples of two different flexible structures 73 in its size. In each case, the flexible structures 73 and the top electrode plates 74 are located between the micromirror structure 71 and the top electrode plate 74. In FIG. 7a, the flexible structure 73 is connected to the pillar structure 72 at the right side of the micromirror structure 71 and the top electrode plate 74. Since the pillar structure 72 is fixed from the substrate, the flexible structure 73 gives the restoration force to the other side attached structures (the top electrode structure 74 and the micromirror structure 71). The post structures 75 connect the micromirror structure 71 and top electrode plate 74 and prevent deformation of the micromirror structure 71. Also in FIG. 7b, the flexible structure 73 is started from the center located pillar structure 72 which is fixed from the substrate. The post structures 75 connect the micromirror structure 71 and top electrode plate 74 and prevent deformation of the micromirror structure 71. And the flexible structure 73 is attached to the post 76 at the top electrode 74 to build restoration force of the micromirror structure 71. These kinds of design of FIGS. 7a-7b have more flexibility in structure than that of FIGS. 6a-6c with the flexible structure 61 and the top electrode plate 62 at the same layer.

Some additional structures can be added in the structure to provide better structural stability, to prevent the stiction which might occur, or to solve other problems that might exist. Since the electrostatic actuation force is mainly dependent on the gap between electrodes and the common area of two electrode planes with different potential, there are some chances to increase the electrostatic actuation force by increasing the acting electrode areas.

Also there exists more space for the flexible structure to have longer length in its dimension. This longer length of the flexible structure also gives more flexibility of the micromirror motion, which can reduce the operating voltage. Another advantage of this structural design embodiment is that the flexible structure design can be independently performed with the other structural components of the micromirror device. Flexible structure can be optimized as it is and later can be attached to the micromirror device.

Figure 8A:
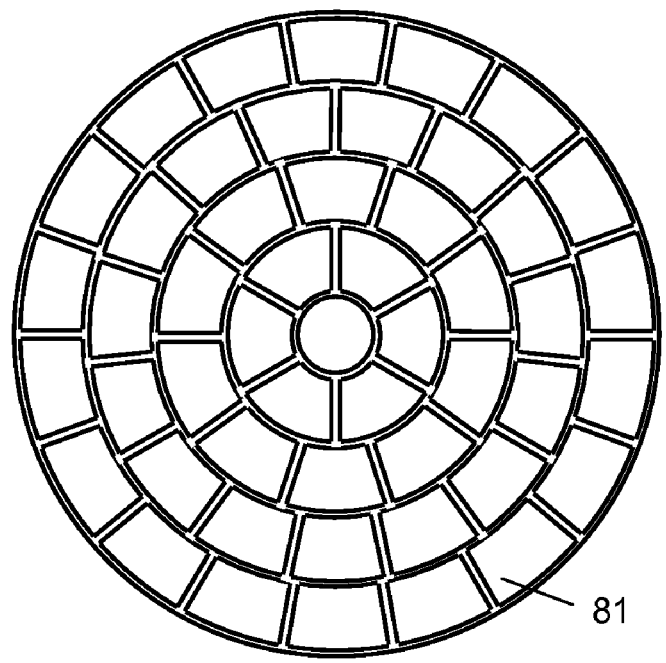
FIGS. 8a-8d are schematic diagrams showing examples for arrays of the micromirrors.
Figure 8B:
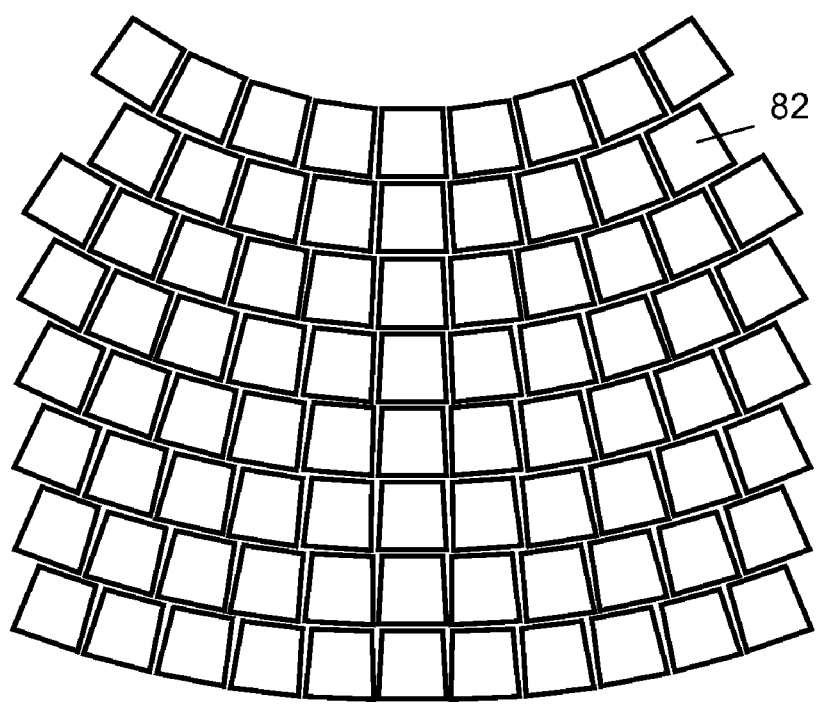
Figure 8C:
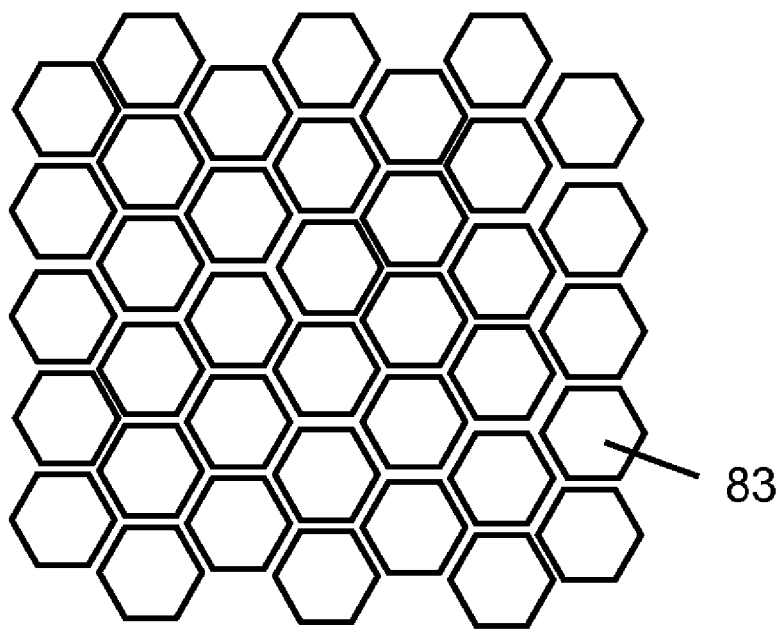
Figure 8D:
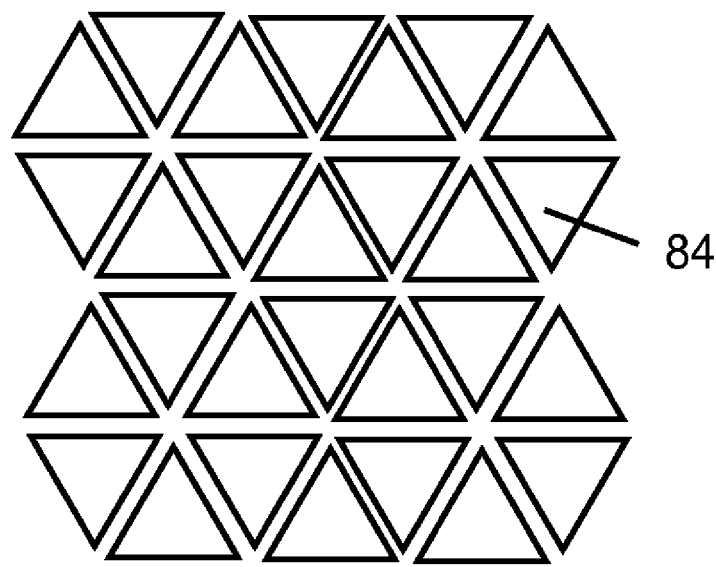

FIGS. 8a-8d show some examples for micromirror arrays. The micromirror devices explained above can be built as an array of micromirrors. To build a micromirror array, the micromirror devices are arranged in side-by-side array. In case of an axisymmetric lens, it would be better for the micromirrors 81 to be arranged in a polar array just like in FIG. 8a. Also the preferable shape of the micromirror device is a fan shape. Each of the micromirrors 81 has a fan shape to increase an effective area of reflection, which increases optical efficiency. The micromirrors 81 are arranged to form one or more concentric circles to form the axisymmetric lens and the micromirrors 81 on the same concentric circle can be controlled by the same control input or independently controlled. The control circuitry can be built by known semiconductor microelectronics technologies such as MOS or CMOS. FIGS. 8b-8d show the arrays of rectangular 82, hexagonal 83, and triangular 84 micromirrors. Each array of micromirror can be selected as the geometry of the micromirror device and system. An array comprising square or rectangle micromirrors 82 is appropriate to a symmetric lens about one in-plane axis such as cylindrical lens. The micromirrors 81, 82, 83, 84 may be controlled by the same control input or independently controlled by using known semiconductor microelectronics technologies such as MOS or CMOS. Applying the microelectronics circuitry under micromirror array, the effective area of reflection can be increased by removing necessary area for electrode pads and wires used to supply actuating power.

The micromirror array can be used as a spatial light modulator. The micromirror devices in the micromirror array are controlled independently. And the micromirror devices in the micromirror array are controlled by a common input signal to form a surface profile. Micromirror array lens is a good example of the usage of the micromirror array. To have a function of a micromirror array lens, the micromirror array should satisfy two conditions to form a good lens. One is the convergence condition that every light should be converged into a focal point. And the other is the phase matching condition that the phase of the converged light should be the same. In a conventional lens, the phase matching condition is that all the light passing through a lens should have the same optical path length to the focal point. But micromirror array lens arranged in a flat surface uses the periodicity of the light to satisfy the phase matching condition. Since the same phase condition occurs periodically, the phase matching condition can be satisfied even though the optical path length is different. Each micromirror in the micromirror array lens can be controlled independently to satisfy the phase matching condition and the convergence condition.

While the invention has been shown and described with reference to different embodiments thereof, it will be appreciated by those skills in the art that variations in form, details, compositions, and operation may be made without departing from the spirit and scope of the invention as defined by the accompanying claims.

What is claimed is:

1. A micromirror device comprising:
   a) a micromirror structure with a reflective surface having rotational and translation motions;
   b) a substrate with bottom electrode or electrodes to provide actuation force for micromirror motions and control circuitry;
   c) a top electrode plate underlying the micromirror structure and electrically coupled with the bottom electrode to provide actuation force for micromirror motions;
   d) a post structure connecting the micromirror structure and the top electrode and preventing deformation of the micromirror structure;
   e) a flexible structure providing restoration force for micromirror motions and connected to the top electrode; and
   f) a pillar structure supporting the flexible structure from the substrate;
   wherein the bottom electrode has a stopped structure to increase electrostatic force by reducing gap between the electrodes.

2. The device of claim 1, wherein the micromirror has a fan, rectangular, square, hexagonal, or triangular shape.

3. The device of claim 1, wherein the micromirror is actuated by actuation force between the top electrode and the bottom electrode.

4. The device of claim 3, wherein the actuation force is electrostatic force.

5. The device of claim 1, wherein the reflective surface of the micromirror structure is substantially flat.

6. The device of claim 1, wherein the reflective surface has a layer or layers to have high reflectivity.

7. The device of claim 6, wherein the reflective surface layer is made of metal or metal compound.

8. The device of claim 6, wherein the reflective surface layer is made of multi-layered dielectric materials.

9. The device of claim 6, wherein the reflective surface layers are made of metal and dielectric material.

10. The device of claim 1, wherein the control circuitry selectively supplies electric power to the electrodes.

11. The device of claim 10, wherein the control circuitry is constructed by using semiconductor microelectronics technologies.

12. The device of claim 1, wherein the flexible structure is located in the same layer of the top electrode plate.

13. The device of claim 1, wherein the top electrode plate further comprises a post to connect the top electrode plate and the flexible structure, wherein the flexible structure is located between the top electrode plate and the micromirror structure.

14. The device of claim 1, wherein the micromirror device has multiple post structures connecting the top electrode plate and the micromirror structure to prevent deformation of the micromirror structure.

15. A micromirror array comprises a plurality of micromirror devices of claim 1 arranged in side-by-side array.

16. The micromirror array of claim 15, wherein the micromirror devices in the micromirror array are controlled independently.

17. The micromirror array of claim 15, wherein the micromirror devices are controlled by a common input signal to form a surface profile.

18. The micromirror array of claim 15, wherein the micromirror array forms a lens satisfying phase matching condition and convergence condition.

19. A micromirror device comprising:
   a) a micromirror structure with a reflective surface having rotational and translation motions;
   b) a substrate with bottom electrode or electrodes to provide actuation force for micromirror motions and control circuitry;
   c) a top electrode plate underlying the micromirror structure and electrically coupled with the bottom electrode to provide actuation force for micromirror motions;
   d) a post structure connecting the micromirror structure and the top electrode and preventing deformation of the micromirror structure;
   e) a flexible structure providing restoration force for micromirror motions and connected to the top electrode; and
   f) a pillar structure supporting the flexible structure from the substrate;
   wherein the top electrode plate comprises a post to connect the top electrode plate and the flexible structure, and wherein the flexible structure is located between the top electrode plate and the micromirror structure.

20. The device of claim 15, wherein the micromirror has a fan, rectangular, square, hexagonal, or triangular shape.

21. The device of claim 15, wherein the micromirror is actuated by actuation force between the top electrode and the bottom electrode.

22. The device of claim 21, wherein the actuation force is electrostatic force.

23. The device of claim 19, wherein the reflective surface of the micromirror structure is substantially flat.

24. The device of claim 19, wherein the reflective surface has a layer or layers to have high reflectivity.

25. The device of claim 24, wherein the reflective surface layer is made of metal or metal compound.

26. The device of claim 24, wherein the reflective surface layer is made of multi-layered dielectric materials.

27. The device of claim 24, wherein the reflective surface layers are made of metal and dielectric material.

28. The device of claim 19, wherein the bottom electrode has a stepped structure to increase electrostatic force by reducing gap between the electrodes.

29. The device of claim 19, wherein the control circuitry selectively supplies electric power to the electrodes.

30. The device of claim 29, wherein the control circuitry is constructed by using semiconductor microelectronics technologies.

31. The device of claim 19, wherein the micromirror device has multiple post structures connecting the top electrode plate and the micromirror structure to prevent deformation of the micromirror structure.

32. A micromirror array comprises a plurality of micromirror devices of claim 19 arranged in side-by-side array.

33. The micromirror array of claim 32, wherein the micromirror devices in the micromirror array are controlled independently.

34. The micromirror array of claim 32, wherein the micromirror devices are controlled by a common input signal to form a surface profile.

35. The micromirror array of claim 32, wherein the micromirror array forms a lens satisfying phase matching condition and convergence condition.

* * * * *